United States Patent
Heldmaier et al.

(10) Patent No.: US 10,126,419 B2
(45) Date of Patent: Nov. 13, 2018

(54) METHOD FOR THE NETWORK INITIALIZATION OF A NETWORK FOR THE RADIO LOCATION OF OBJECTS WITHIN A LIMITED SPACE

(71) Applicant: Balluff GmbH, Neuhausen a.d.F. (DE)

(72) Inventors: Matthias Michael Heldmaier, Stuttgart (DE); Andreas Schuerzinger, Schwaebisch Gmuend (DE); Daniel Schweizer, Filderstadt (DE)

(73) Assignee: Balluff GmbH, Neuhausen a.d.F. (DE)

( * ) Notice: Subject to any disclaimer, the term of this patent is extended or adjusted under 35 U.S.C. 154(b) by 0 days.

(21) Appl. No.: 15/490,998

(22) Filed: Apr. 19, 2017

(65) Prior Publication Data
US 2017/0315223 A1 Nov. 2, 2017

(30) Foreign Application Priority Data

Apr. 28, 2016 (DE) .................. 10 2016 107 940

(51) Int. Cl.
| | |
|---|---|
| *G01S 13/46* | (2006.01) |
| *H04W 4/04* | (2009.01) |
| *H04W 8/24* | (2009.01) |
| *G01S 1/04* | (2006.01) |
| *G01S 1/08* | (2006.01) |
| *H04W 74/08* | (2009.01) |
| *H04W 84/18* | (2009.01) |

(52) U.S. Cl.
CPC ............... *G01S 13/46* (2013.01); *G01S 1/04* (2013.01); *G01S 1/08* (2013.01); *H04W 4/043* (2013.01); *H04W 8/24* (2013.01); *G01S 2013/466* (2013.01); *H04W 74/0808* (2013.01); *H04W 84/18* (2013.01)

(58) Field of Classification Search
CPC .............................. H04W 4/043; G01S 13/46
USPC ..................... 455/456.1, 67.11, 3.01
See application file for complete search history.

(56) References Cited

U.S. PATENT DOCUMENTS

| | | | |
|---|---|---|---|
| 6,133,876 A | 10/2000 | Fullerton et al. | |
| 7,092,914 B1* | 8/2006 | Shear ................. | G06Q 20/3674 705/67 |
| 7,873,099 B2 | 1/2011 | Fullerton et al. | |
| 2017/0055121 A1* | 2/2017 | Ciecko ................ | H04W 4/021 |
| 2017/0201865 A1* | 7/2017 | Cho ...................... | H04W 4/026 |

OTHER PUBLICATIONS

DE 10 2016 103 077.5 filed Feb. 22, 2016.
U.S. Appl. No. 15/403,264, filed Jan. 11, 2017.

* cited by examiner

*Primary Examiner* — John J Lee
(74) *Attorney, Agent, or Firm* — Collard & Roe, P.C.

(57) ABSTRACT

In a method for initializing at least one network segment of a network for the wireless location of movable locating objects arranged in a limited space using pulsed radio signals, wherein the at least one network segment in the limited space has at least two spaced apart reference nodes which form a chain-shaped communication network and which are autarkic in terms of communication, wherein a locating object arranged in the limited space is able to be located using one of the distance-based trilateration carried out by at least three reference nodes, and wherein general information is communicated by broadcast channels, the reference nodes listen to the broadcast channels in a standby position until initial information about their active participation in the communication network is received.

17 Claims, 11 Drawing Sheets

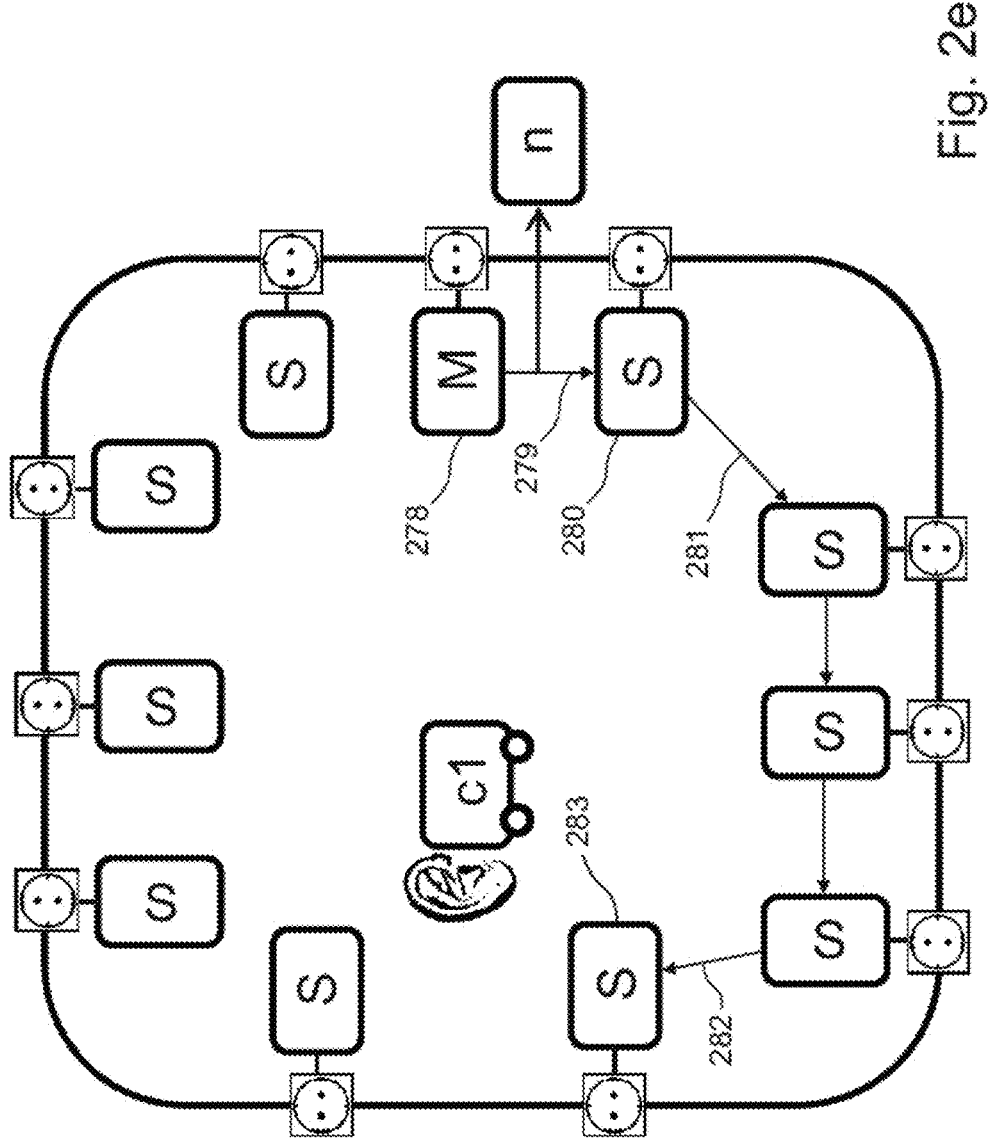

| Slot | | |
|---|---|---|
| 1 | 0 → 11, 0 → 21 | Forward Broadcast |
| 2 | | Measurement at C1 |
| 3 | 11 → 12 | Forward Broadcast |
| 4 | | Measurement at C2 |
| 5 | 21 → 22 | Forward Broadcast |
| 6 | | C1 measurement |
| 7 | 12 → 13 | Forward Broadcast |
| 8 | | C2 measurement |
| 9 | 22 → 23 | Forward Broadcast |
| 10 | | C1 measurement |
| 11 | 13 → 14 | Forward Broadcast |
| 12 | | C2 measurement |
| 13 | 23 → 24 | Forward Broadcast |
| 14 | | C1 measurement |
| 15 | 14 → 15 | Forward Broadcast |
| 16 | | C2 measurement |
| 17 | 24 → 25 | Forward Broadcast |
| 18 | | C1 measurement |
| 19 | 15 | Forward Broadcast |
| 20 | | C2 measurement |
| 21 | 25 | Forward Broadcast |
| 22 | 15 → 14 | Return broadcast, C2 measurement |
| 23 | 25 → 24 | Return broadcast, C1 measurement |
| 24 | 14 → 13 | Return broadcast, C2 measurement |
| 25 | 24 → 23 | Return broadcast, C1 measurement |
| 26 | 13 12 | Return broadcast, C2 measurement |
| 27 | 23 22 | Return broadcast, C1 measurement |
| 28 | 12 11 | Return broadcast, C2 measurement |
| 29 | 22 21 | Return broadcast, C1 measurement |
| 30 | 11 0 | Return broadcast, C2 measurement |
| 31 | 21 0 | Return broadcast, C1 measurement |
| 32 | Idle | Idle |

Fig. 3a

Channel distribution in a localisation network with 175 code channels

| 315 | | | | | | | | | | 340 | | | | | 350 | | | | |
|---|---|---|---|---|---|---|---|---|---|---|---|---|---|---|---|---|---|---|---|
| 0 | 1 | 2 | 3 | 4 | | | | | | 0 | 1 | 2 | 3 | 4 | 0 | 1 | 2 | 3 | 4 |
| 5 | 6 | 7 | 8 | 9 | | | | | | 5 | 6 | 7 | 8 | 9 | | | | | |
| 10 | 11 | 12 | 13 | 14 | | | | | | 10 | 11 | 12 | 13 | 14 | | | | | |
| 15 | 16 | 17 | 18 | 19 | | | | | | 15 | 16 | 17 | 18 | 19 | | | | | |
| 20 | 21 | 22 | 23 | 24 | | | | | | 20 | 21 | 22 | 23 | 24 | 20 | 21 | 22 | 23 | 24 |
| 25 | 26 | 27 | 28 | 29 | | | | | | 0 | 1 | 2 | 3 | 4 | 0 | 1 | 2 | 3 | 4 |
| ... | | | | | | | | | | ... | | | | | ... | | | | |
| 45 | 46 | 47 | 48 | 49 | | | | | | 20 | 21 | 22 | 23 | 24 | 20 | 21 | 22 | 23 | 24 |

320  335                                                            345

Channel bundles of the segments 325  330

| 50 | 51 | 52 | 53 | 54 | | | | | | 70 | 71 | 72 | 73 | 74 |
|---|---|---|---|---|---|---|---|---|---|---|---|---|---|---|
| 75 | 76 | 77 | 78 | 79 | | | | | | 95 | 96 | 97 | 98 | 99 |

Fig. 3b

METHOD FOR THE NETWORK INITIALIZATION OF A NETWORK FOR THE RADIO LOCATION OF OBJECTS WITHIN A LIMITED SPACE

CROSS REFERENCE TO RELATED APPLICATIONS

Applicant claims priority under 35 U.S.C. § 119 of German Application No. 10 2016 107 940.5 filed Apr. 28, 2016, the disclosure of which is incorporated by reference.

BACKGROUND OF THE INVENTION

1. Field of the Invention

The invention relates to a method for initializing a network for wirelessly locating or determining the position of objects within a limited space. The subject matter of the present invention also includes a computer program and a machine-readable data storage medium for saving the computer program, by means of which the method according to the invention can be executed.

2. Description of the Related Art

The spatial location of moving objects by means of wireless or radio localization is known in the field of industrial factory buildings, production halls, factory premises or similar. Such objects can, on the one hand, be automatic industrial trucks (Automated Guided Vehicles—AGV) which are used in driverless transport systems. These industrial trucks are automatically driven and move along real or virtual guide lines without human intervention. In the fields of warehousing or industrial production, such a location can relate e.g. to steel products such as slabs or coils stored in a steelworks, wherein these objects can, however, also be autarkic robotic vehicles, fork lifts or similar. During this process, a one-dimensional location along the tracking e.g. of a crane, a two-dimensional location in an even plane or a spatial location of objects, e.g. in a three-dimensional stock management system, can take place.

Such a radio location system has become known from U.S. Pat. No. 6,133,876, which is referred to in its entirety by means of incorporation by reference, and relates to a method and a network arrangement for position determination by means of pulsed radio signals (known as an "Impulse Radio System"). As part of this, a first transceiver with a first clock and a second transceiver spaced from the first transceiver having a second clock are provided. A first reference clock impulse is generated using the first clock, and a first series of impulses is transmitted from the first transceiver by this reference clock impulse. This first series of impulses is received by the second transceiver and the second transceiver is synchronized based on these impulses. Using the second clock, a second reference clock impulse is generated from the second transceiver and thus a second series of impulses is transmitted from the second transceiver. The first transceiver receives this second series of impulses and uses them to carry out a synchronization. Based on this synchronization, a first reference clock impulse with a corresponding time delay is then generated and from this, the time difference between the first reference impulse and the delayed first reference impulse is determined, wherein this time difference specifies an overall running time of the first and second series of impulses.

A location system based on the ultra-wideband (UWB) signals and, correspondingly, based on the run-time or flight-time measurements arises from U.S. Pat. No. 7,873,099, in which a UWB receiver of a corresponding data communication network synchronizes receiver time information based on a received signal structure, wherein the time information is demodulated and wherein the demodulated time information is used to set a receiver clock. The receiver clock is adjusted based on information about the run-time delay by increasing the receiver clock value in order to balance out said run-time delay. The run-time delay is determined based on a known distance between the transmitter and receiver, wherein the transmitter and receiver can be part of a two-way connection, and wherein the run-time delay is determined by the measurement of round trip timing, i.e. by measuring the time which a data package in the data communication network requires for the transmission from transmitter to receiver and back.

SUMMARY OF THE INVENTION

The invention relates to a method for the initialization of a network concerned here, e.g. upon its commissioning or when restarting the network, which is used for locating or spatially localizing (locating) objects concerned here, that are preferably moving within a spatially limited space or area, by means of a wireless or a radio-based, distance-based measuring process. Such a measuring process is preferably based on said run-time and flight-time measurements, wherein each of said objects has a "label" which is described in more detail below, by means of which the object is clearly identifiable or is able to be clearly distinguished from other objects. An object which actively participates in the measuring process is also referred to as a "participant" in the following. During this process, an object can be arranged on an industrial truck as specified at the start, or on any other property asset, the location of which in such a space is to be determined.

The measuring process and the network are based on a network topology in which a number of autarkic reference nodes are arranged to be spread out in the limited space or area. The corresponding network is preferably controlled by means of one or more administration nodes. However, it should be noted that the functionality of the at least one administration node can also be implemented in a reference node. The reference nodes are preferably in linear connection with one another in terms of their communication technology, preferably by means of an inherently known wireless "daisy chain" (DC), whereby the communication between the reference nodes or between an administration node and the reference nodes takes place such that it is able to be controlled.

Alternatively, the chain can also be formed to be a ring, a star, a circle or any other shape, provided that the chain between two reference nodes is at least locally linear in shape. Thus, at least two daisy chain (DC) topologies can also be arranged in one network segment, which has the further advantage that a running measuring process in the second DC topology can continue to be carried out simultaneously without any errors if a new participant registers in the first DC topology.

In the method according to the invention for initializing a specified network it is provided that the reference nodes to initially be in a standby position in which they initially only listen to broadcast channels until they receive initial information from a broadcast by any administration node about whether and in which segment they are a reference node or not. The reference nodes generate a neighbor database by communication with adjacent reference nodes, by means of said neighbor database the two daisy chains are able to be autarkically operated by the reference nodes after initialization has taken place.

In the method according to the invention it can be provided that the at least one administration node to communicate DC set up information to the reference nodes, which is successively further communicated to other reference nodes in a daisy chain. Said DC set up information preferably comprises the chain length and corresponding UIDs and LIDs for the reference nodes participating in the chain.

Said "UID" represents here a unique identifier, which is inherently known and independent from the respective position in the network, of a participant in the network, e.g. an inherently known "MAC ID". Said "LID" corresponds to a local identification which is also inherently known and depends on the position of the participant in the network.

In the method according to the invention it can be further provided that, starting from a last reference node in a daisy chain formed in this way, after receipt of said information, a propagating confirmation response (DC setup "Acknowledge") to all other reference nodes of this network segment gradually takes place via the reference nodes of the chain. The information thus propagated may include the return of a respective LID and the LIDs of the reference nodes, via which the confirmation response has run until the current time. Even more information can be included in the corresponding response data package, which confirms the successful formation of the daisy chain and is used for the network diagnosis. In case of a failure, the administration node can thus calculate another daisy chain configuration.

In the method according to the invention, it can be further provided that the administration node transmits initialization packages to the reference nodes. These initialization packages preferably consist of a localization measurement request to the respective reference nodes, a command which signalizes the segment initialization and further information that describes the network topology and/or the configuration status of the administration node. Said further information can consist of the firmware used, the number of the segments present in the network and said UIDs of the reference nodes which belong to the respective segments, as well as said SIDs of the corresponding segments and the allocation of the reference nodes to the segments.

In the method according to the invention, it can be further provided that the reference nodes create a neighbor(hood) database which contains statistics relating to which participants could hear a communication signal, at which signal and fault signal levels and/or how often the localization measurement functions or has failed. By means of these statistics, a very efficient troubleshooting process can also be carried out. Furthermore, information on the measured distances of the participating reference nodes and/or on the received initialization packages can also be provided in the neighborhood database. This information can be shared with other reference nodes during initialization in order to thus generate or receive a neighborhood database which is uniform across all segments.

The method according to the invention can furthermore provide that, after the end of said collection of statistics, the administration node forms a stable segment structure in the form of functional daisy chains, wherein preferably two chains are formed from reference nodes which ensure as reliable a data exchange as possible, and wherein the two chains are preferably of the same length.

The method according to the invention can furthermore provide that, after the generation of the daisy chains, the administration node communicates this generated connection together with a command to the reference nodes of the chains formed in this way, by means of said command the construction of the respective daisy chain is arranged. The message used for this preferably contains the length of the chain(s), a counter and UIDs and LIDs of the reference nodes in the order in which they follow one another in the respective chain.

The method according to the invention for the initialization is preferably implemented by means of one or several administration nodes additionally arranged in the network. However, it should be noted that the functionality of the at least one administration node can also be implemented in at least one said reference node.

The method according to the invention for the initialization can also be used in a network which is split into at least two segments, whereby extensive or large-scale factory buildings or premises can also be covered by only one position determination or monitoring system. The at least two segments are able to independently organize their communication within their respective segment during the initialization of the entire network, or of only one segment, in such a way that strong structures arise in which the communication is able to take place with as few errors as possible. At the same time, e.g. a change to a factory building due to renovation and the changes related to this in terms of the factory building properties can thus be responded to in terms of electromagnetic wave transmission.

The measuring process for localizing objects, carried out after the initialization according to the invention, or in the corresponding initialized network, takes place via "trilateration", i.e. by means of pulsed radio signals e.g. by means of ultra-wideband (UWB) radio or measurement signals, or corresponding short pulsed measurement signals. The trilateration is thus based on corresponding distance or clearance measurements relative to at least three points in the case of a two-dimensional position determination or of at least four points in the case of three-dimensional or spatial position determination. The inherently known UWB technology is particularly suitable for the present spatially limited measurement range as close-range radio technology. The measurement signals for the flight-time measurements are preferably transmitted or received in a succession of temporally sequential time windows or time slots. If only in time domain very short pulses of a signal are transmitted at a certain carrier frequency, a broadband spectrum results in the frequency domain due to Fourier transform. This bandwidth is in the range of ≥500 MHz for UWB signals. Use is made of the very short pulses available for precise locating of objects and/or reference nodes. The measurements are preferably initiated from specified locating objects, wherein an arrangement of at least three reference nodes allows the precise spatial location of objects or participants in one plane and wherein an arrangement of at least three reference nodes allows a precise spatial location of objects or participants in the three-dimensional space.

The measuring process can be implemented by a suitable combination both of a time division multiple access (TDMA) process and a code division multiple access (CDMA) process. The TDMA process is of particular significance for a subsequent position determination from distance measurements in the actual measuring process after network initialization, along with a corresponding method which is described in detail in the prior application DE 10 2016 103 077.5 and can be dynamically generated using the time window related here. During this process, all participants are dynamically provided with a new TDMA time slot card or map via a specified signal path e.g. UWB. At the same time, the topology of this network is communicated to new participants such that almost no configuration work, or no configuration work at all, is needed.

A special time slot (forward broadcast slot), which is kept free for the transport of network information, can also be provided in said TDMA slot map. The information which is transported in the broadcast slot includes e.g. information on the coordinate system, on the network topology (e.g. a specified almanac list). In addition to this, said IDs (UID and LID) of participants whose registration on the network has already been accepted can be communicated. Said information only represents examples of possible information, any further information can be transmitted. If there are no changes on the network, the forward broadcast is essentially unused. In order to reach the highest possible level of redundancy, all other participants (no matter whether locating object or reference node) in the localization segment only listen during the broadcast, or if necessary process the information contained in the broadcast.

In the additional information, a local identifier ("SID" =segment identification number) of a network segment can be provided, wherein, in a network with several segments, the combination of SID and LID provides the identifier of a participant necessary for the measuring operation. The communication channels generated via CDMA that are used in an individual segment for registering and the measuring operation can be clearly determined and divided into channel bundles using the SID.

A so-called return broadcast can also be provided i.e. an information telegram with which neighboring participants in a daisy chain communicate, in a reverse direction to the forward broadcast, who has registered or deregistered in the network or the segment in the current cycle of the TDMA slot map. Further information for network diagnosis purposes can also be transmitted.

A robust communication structure and network initialization of the infrastructure is obtained by the method for initialization according to the invention which allows the autonomous registration of locating objects and a reliable measuring process, even if there are fluctuating ambient conditions. Changes to the environment with regard to radio technology can be responded to. The reorganization of segments can take place separately from the entire network. For this reason, only relatively few special data connections are needed outside the UWB network (e.g. LAN, WLAN). Data connections are not needed at all in special embodiments of the system. In addition to this, faults in radio operation or a failure of a reference node can be responded to directly by reorganization, without the necessity for external reconfigurations involving a lot of work.

It should furthermore be noted that the entire communication or corresponding signal transfer for the network initialization described herein can take place both synchronously and asynchronously.

The computer program according to the invention is configured to carry out every method step, especially if it is running on a computing device. For this purpose, the machine-readable data storage medium is provided on which the computer program according to the invention is saved. By importing the computer program according to the invention into a network related here, especially into said administration node or a data processing device connected to this, the method according to the invention for initializing, especially for the self-organizing initialization of a network related here, will be retained, wherein the network initialized in this way is configured to operate or control a specified measuring process.

Further advantages and embodiments of the invention arise from the description and the accompanying drawings.

It is understood that the features mentioned above and those still to be mentioned below are not just usable in the respective specified combination but can also be used in other combinations or individually, without venturing outside the scope of the present invention.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIGS. 2a-2g show exemplary states in an initialization according to the invention of a network related here at different points in time;

FIG. 3a shows a table of an exemplary time sequence of a communication protocol for measuring distance in a localization segment in accordance with the invention, as becomes valid after the initialization of a segment shown in FIG. 1 is complete. This table corresponds to a basic TDMA slot map, which forms a basic sequence of time slots;

FIG. 3b shows an exemplary channel distribution in a network formed from more than one segment, wherein each of the individual segments is constructed in a similar way to the segment shown in FIG. 1.

DETAILED DESCRIPTION OF PREFERRED EMBODIMENTS

Figure 1:
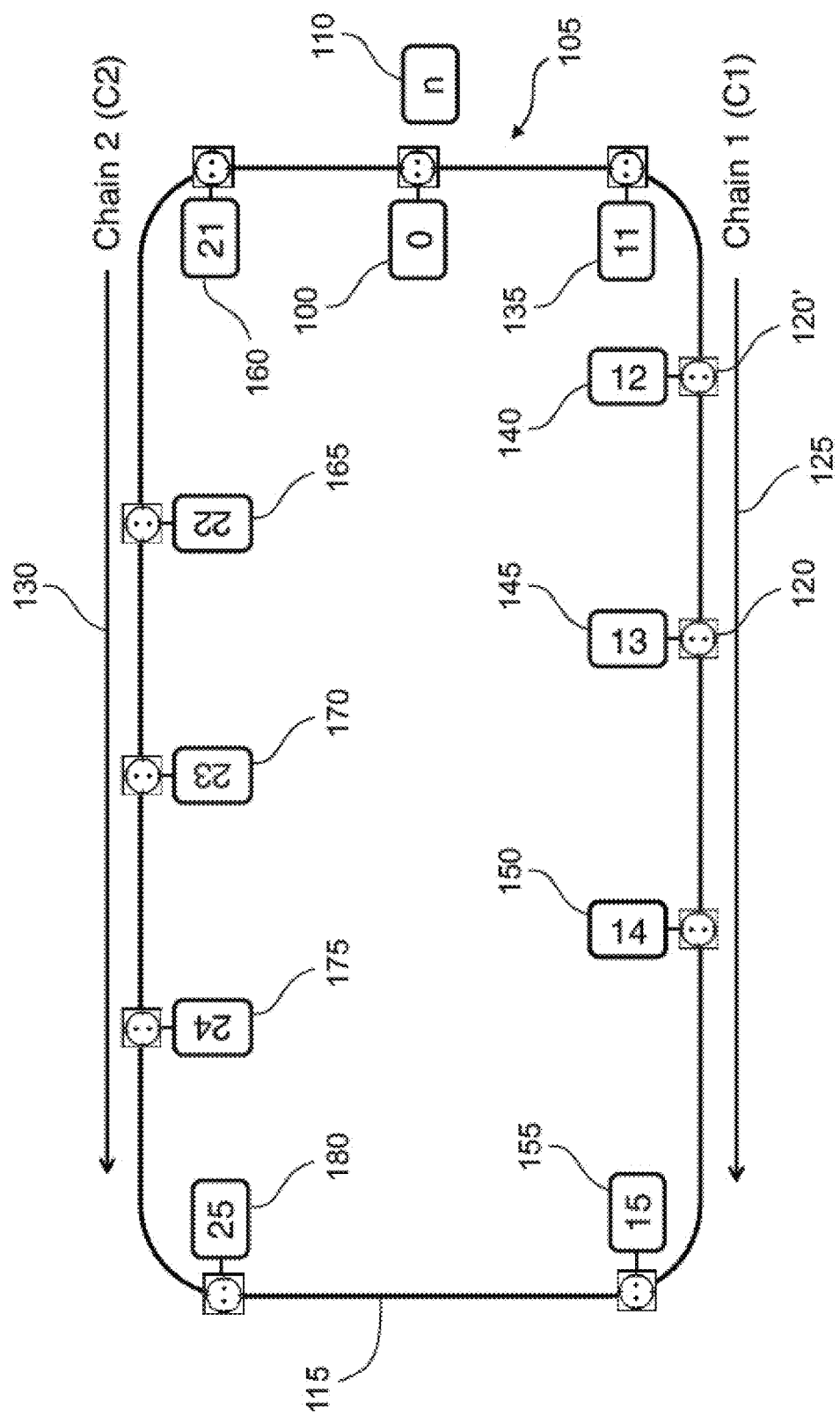
FIG. 1 shows a network formed from two daisy chains and comprising a segment, an initialization according to the invention being able to be carried out in said network.

FIG. 1 shows an exemplary logical structure of a locating segment, formed from two daisy chains, of a localization network. In the communication chain in the example based on said UWB technology, communication messages between "neighboring" participants are sequentially propagated within the two "daisy chains".

The arrangement shown in FIG. 1 includes an administration node 100 that, in the exemplary embodiment, has an inherently known data connection to an external IT server 110 via an ethernet connection 105. This server functionality, however, can also be implemented in the administration node 100 itself. A limited space is defined by the line 115, the participants being arranged in said space or being able to move (dynamically). Power supply units 120, 120' are arranged on this outer limit line 115 in order to supply the participants with the electrical energy required for their operation.

In the lower half of the drawing, a first daisy chain (C1) 125, and in the upper half of the drawing a second daisy chain (C2) 130, branch off from the administration node 100. In this exemplary embodiment, there are five reference nodes 135-155 along the first daisy chain 125, and in the second daisy chain 130 also five reference nodes 160-180 are arranged. It must also be noted that no (actual) locating objects are shown in this drawing yet.

A localization measurement of participants carried out in the network shown in FIG. 1 takes place using the known method of "trilateration". This method is based on the fact that, in case of knowing only the distance of an object to a known point, its own location (in planar view) is on a sphere or, in a 3D space, on a spherical shell around this point. In the case of two known points, its own location is on the points of intersection of the two spherical shells, i.e. on a circular line.

In FIGS. 2a-2g, exemplary method steps of a first exemplary embodiment of the method according to the invention for initializing a network segment exemplarily shown in FIG. 1 using a sequence of network statuses are illustrated. A single locating object 200 is shown in these drawings (FIGS. 2a-2g), which is not yet registered and, accordingly, is not yet a "participant" in the current sense. For this reason, in FIG. 2a the object 200 is provided with a human ear 205 in order to signify that the object 200, as described in detail in the following, listens to a broadcast channel.

It must be noted that the entire communication or corresponding signal transfer for network initialization described here can be either synchronous or asynchronous. In the following exemplary embodiment, only an asynchronous signal transmission is supposed, wherein the following described basic processes can be used accordingly in the case of a synchronous signal transmission.

It must be furthermore noted that the described method is used in general for segment initialization and locating objects therefore can or are permitted to have active participation in communication only after this initialization phase is completed. Active participation is commenced by registering in the corresponding network segment after the segment initialization.

In this exemplary embodiment, it is furthermore assumed that there is a basic functional localization network shown in FIG. 1 in accordance with the following definition, i.e. the reference nodes and the administration node are able to transmit UWB radio signals and have a valid UID.

The number specified for the daisy chains formed in the following of five reference nodes per chain is only exemplary, and can be any number greater or less than 5, wherein the total number of reference nodes in the two-dimensional or virtual three-dimensional localization of a locating object by means of trilateration in any case should preferably be >=3. In a one-dimensional localization or locating of a locating object along a line, a total number of reference nodes of >=2 suffices. However, it must be highlighted that, in the case of pure presence detection of a locating object ("zero dimensional location"), or if the position in the case of a one-dimensional location can be reduced to a half axis whose start represents the reference node, the use of a total of only one reference node is possible. The two daisy chains can also contain different numbers of reference nodes. However, a symmetrical construction from the point of view of resource efficiency and maximum measuring speed in the subsequent measurement operation is preferable. The reference nodes from the daisy chain C1 are labelled in the following with the numbers 11' to 15' contained in FIG. 1, the reference nodes from the daisy chain C2 are labelled with the numbers 21' to 25'.

Figure 2A:
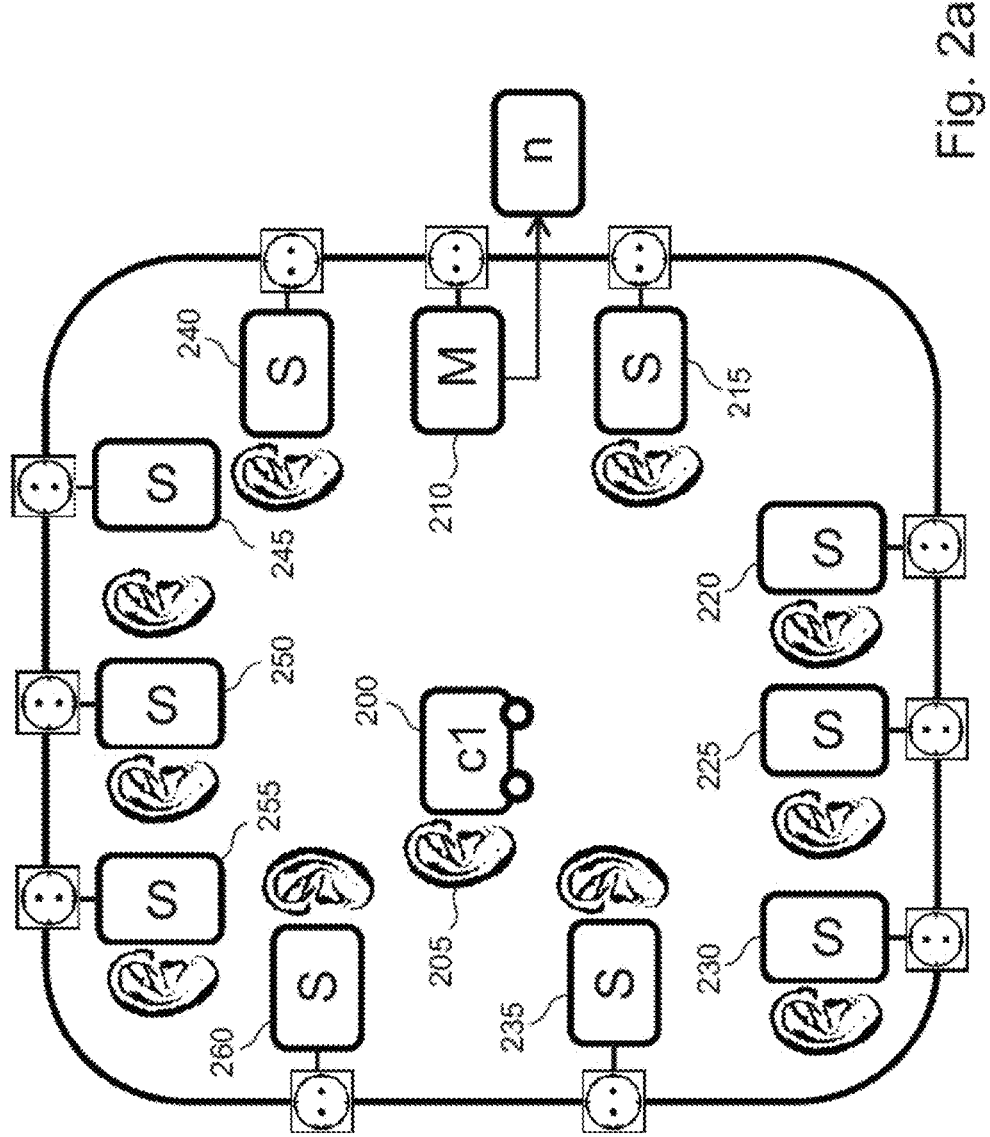

As can be seen in FIG. 2a, all participants 200, 215-235 and 240-260, with the exception of the administration node 210, are in a so-called "ALOHA" mode at the start of the initialization. Communication in ALOHA mode takes place based on a "listen before talk" procedure with additional stochastic telegram communication. In the special case specified here, the participants, with the exception of the administration node, are in a standby position in which they initially only listen to the different broadcast channels and do not send any of their own messages. During this process, every administration node, i.e. in the current network segment the administration node 210, transmits initialization commands together with information on network topology and the configuration status of the administration node, which is primarily determined for the reference nodes in its own segment and is also especially necessary for later distance measurements. The information on the network topology includes the number and SIDS of the segments configured in the network, the UIDs of all reference nodes available in the localization network and its assignment to the respective segment. In addition to the UID, the reference nodes are assigned with a provisional LID in their own segment. The information on the configuration status of the administration node consists primarily of information on its firmware status.

Figure 2B:
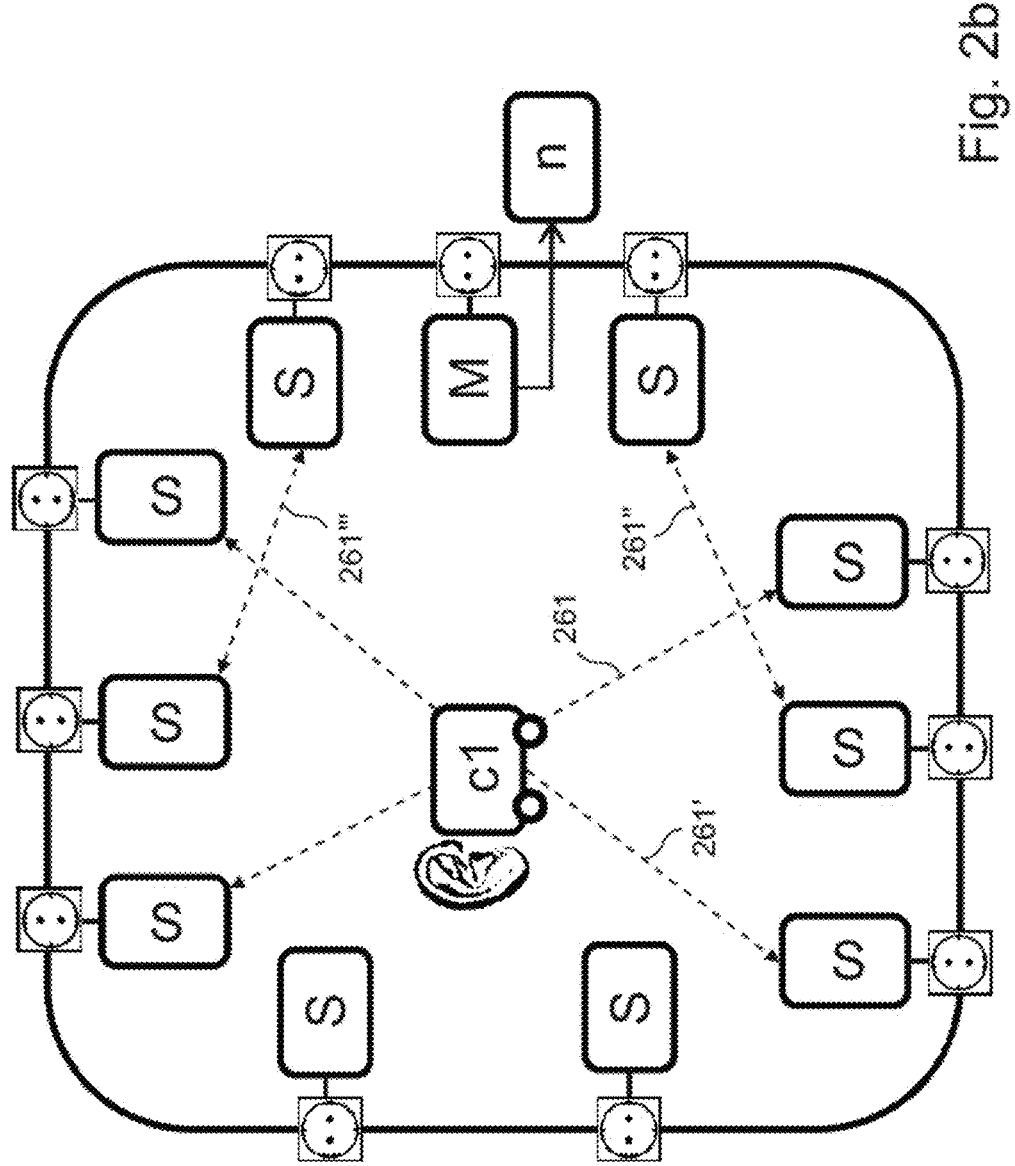

During this process, the reference nodes 215-260 switch between the different possible broadcasting channels until they receive initial information from a broadcast of a random segment as to whether and in which segment they are a reference node or not. If necessary, they switch to the broadcast channel of the segment in which they are specified as a reference in order to participate in the correct segment in the network initialization. After they have received their provisional LID in their target segment, the reference nodes take part in the communication 261, 261', 261" and 261'" in their segment by repeating the initialization command and information of the administration node during the simultaneous distance measurement to any reference nodes in their segment, as can be seen in FIG. 2b. During this process, the reference nodes also create a neighbor database by evaluating the communication taking place, by means of which both daisy chains of the reference nodes can be subsequently autarkically operated. Along with the measured distance to the other reference nodes, in the neighbor database there is also information on the received signal amplitudes ($V_{Peak}$), the background noise and the occurrence or failure of UWB connections, by means of which the following most stable (in terms of communication) possible daisy chains can be formed.

During this process, the above described communication expands in an avalanche-like way in the network. A sufficiently long waiting period is necessary to ensure that all reference nodes are able to participate in this chaotic communication flow for long enough in order to generate a reliable database in the statistics and neighbor database. The end of this first initialization phase is triggered by the administration node transmitting a new command instead of the initialization command which instructs the reference nodes to communicate the respectively logged statistics database to this segment. In the following communication that follows, simultaneously resulting distance measurements are not necessary. This command, in turn, expands in an avalanche-like way within the segment. Reference nodes repeat this command randomly in turn together with the content of their neighbor database. Neighbor databases that have been listened to of other reference nodes are completely integrated into their own database and the updated data set is transmitted if the communication process is participated in once more. The result of this is that, after a certain period of time has elapsed, all reference nodes and the administration node have the same information, which is complete from the point of view of communication, about the neighboring relationships in the network segment. If the administration node does not detect any more change in the neighbor database for a certain amount of time, or if a certain maximum waiting time has expired, the administration node ends the described spreading of the neighbor(hood) database in the network.

Figure 2C:
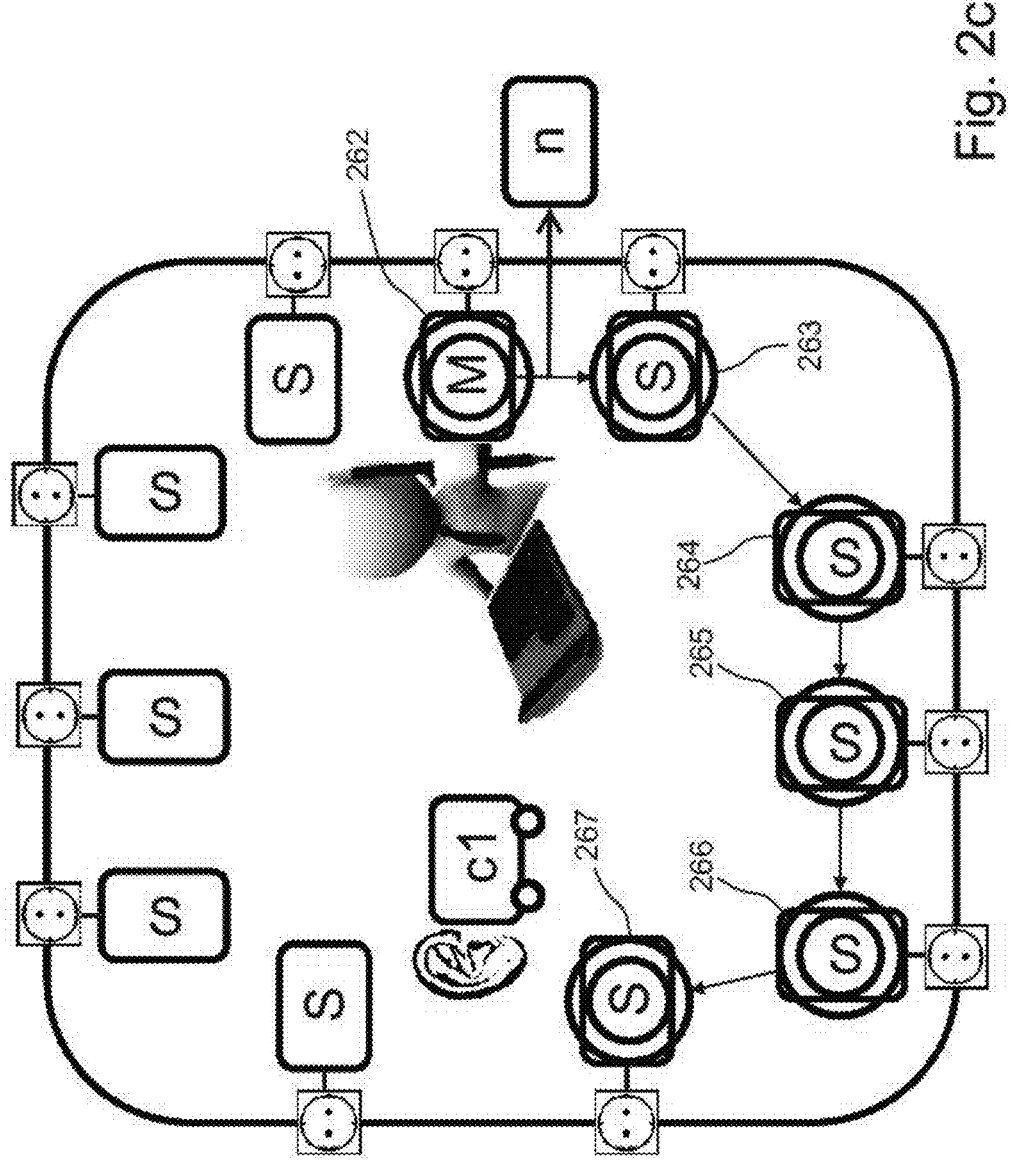

With the help of the neighbor database, the administration node calculates a stable daisy chain structure from the information collected. Different weightings can thus be used for the statistical information recorded in the neighbor database, which, when added together, ensure that information can be reliably and completely propagated along the daisy chain. In order to achieve a higher tolerance to errors, it can e.g. be taken into account that next-but-one or next-but-two neighbors within the formed daisy chain are also able to communicate directly with each other as reliably as possible. Furthermore, the administration node can also assign the reference nodes with a new LID, which e.g. indicates their daisy chain and position within this. It is shown in FIG. 2c how the administration node 210 in this example generates the lower daisy chain 215-235 and communicates this generation to the reference nodes within the daisy chain. Thus, the administration node 210 transmits 262 (as respectively implied by the circular wave propagation) the chain setup information together with a counter to diagnose the propagation of this message to the nearest reference node 215. This reference node communicates this information 263, in turn, to the next reference node 220. In this way the two reference nodes 225, 230 following this also communicate 264-266 the chain setup information until the last reference node 235 of the lower daisy chain. Said chain setup information comprises amoung others the chain length and corresponding UIDS, and if available the new LIDS for reference nodes participating in the chain. If a reference node notices that the information it has sent is not being spread further, it resends the data package that it has already sent. This is advantageous because, in this way, the lower daisy chain can also receive information about the planned second daisy chain.

Figure 2D:
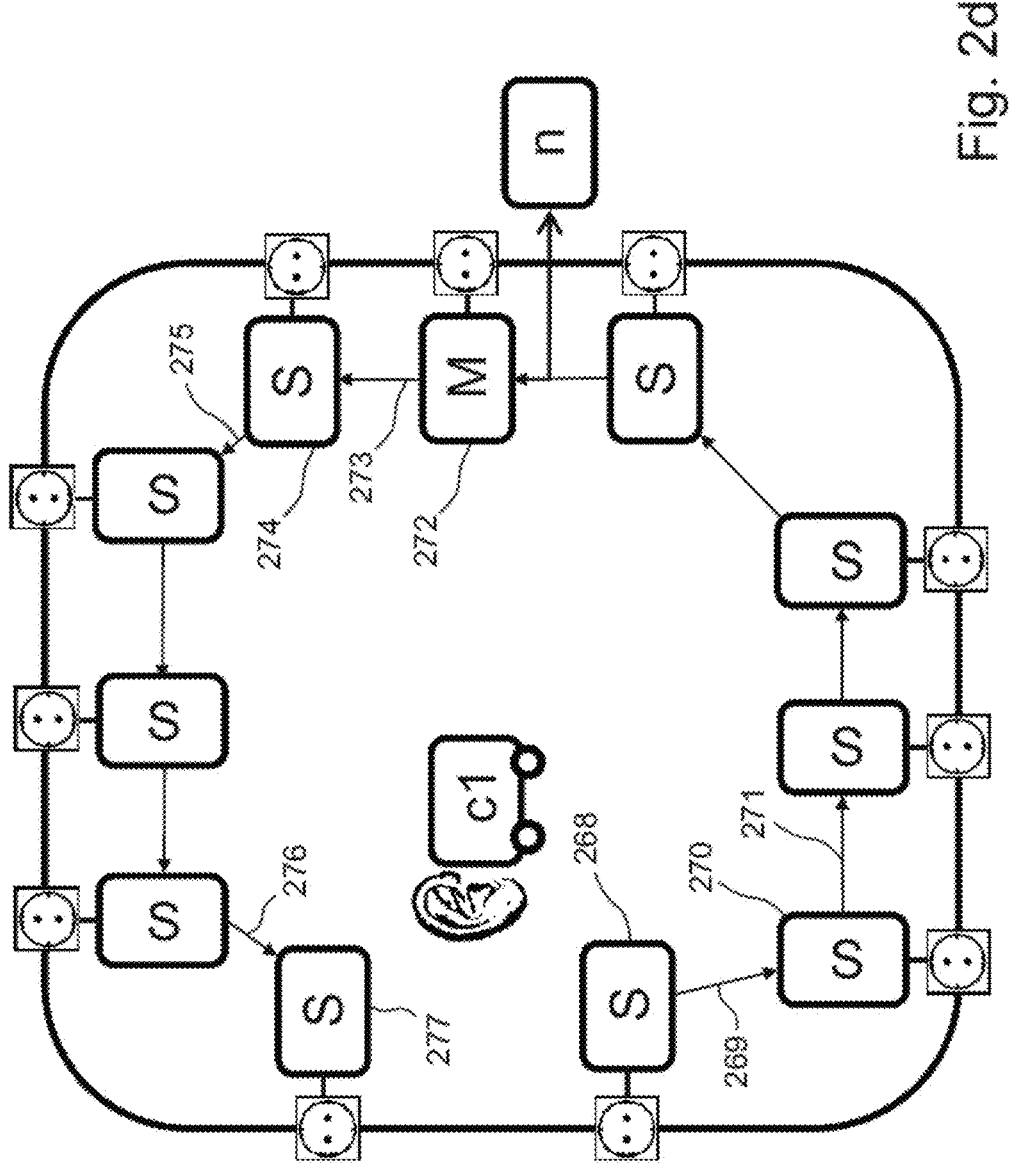

In FIG. 2d a response to confirm the successful DC set-up starting from the last reference node 235 in the lower chain, by means of the reference nodes, or a corresponding propagation to all other reference nodes of this daisy chain, in which a chain setup "acknowledge" (i.e. corresponding acceptance or confirmation of the resultant chain generation) takes place, including the feedback of diagnostic information, e.g. in the form of the respective LID. The response starts by transmitting 268 a corresponding communication 269 to the next reference node which, in turn, transmits a corresponding communication 271 to the next reference node 270. If forming the daisy chain has not been possible because the broadcast shown in FIG. 2c could not be spread widely enough or could not be spread further, the described response takes place from the reference node, which was the last to have further spread the broadcast information. The diagnostic information in the chain setup "acknowledge" can then be used by the administration node if needed to generate a better daisy chain (abbreviated in the following as "DC").

The administration node 210 repeats the procedure described in the previous two paragraphs to form the upper DC. This is signified by communication along the arrows 273-277 which represents the formation of the DC from the reference nodes 240-260. Along this new second DC, a chain set up "acknowledge" is finally also transmitted back to the administration node, analogously to the procedure described above. Thus, in the whole segment, the formation of both chains has occurred and is complete.

The reference nodes then receive a complete dataset for describing the network. This is shown in FIG. 2e. For this purpose, the administration node in turn transmits information by means of forward broadcast 278 along the lower daisy chain, as is signified by the arrows 279, 281 and 282. During this process, the reference nodes repeat the respective complete received information. The data set for describing the network typically contains a complete almanac with the known positions of all reference nodes in the entire localization network. Further information can also be communicated to the selected coordinates system (coordinates transformation, rotation) and to logical spaces. Due to the data quantity, the information must be spread out on several data pages. As in the case in the formation of the daisy chains, a confirmation of the successful information transfer occurs from the end of the daisy chain or from the last reached participant via a feedback data and diagnostic diagram.

Figure 2F:
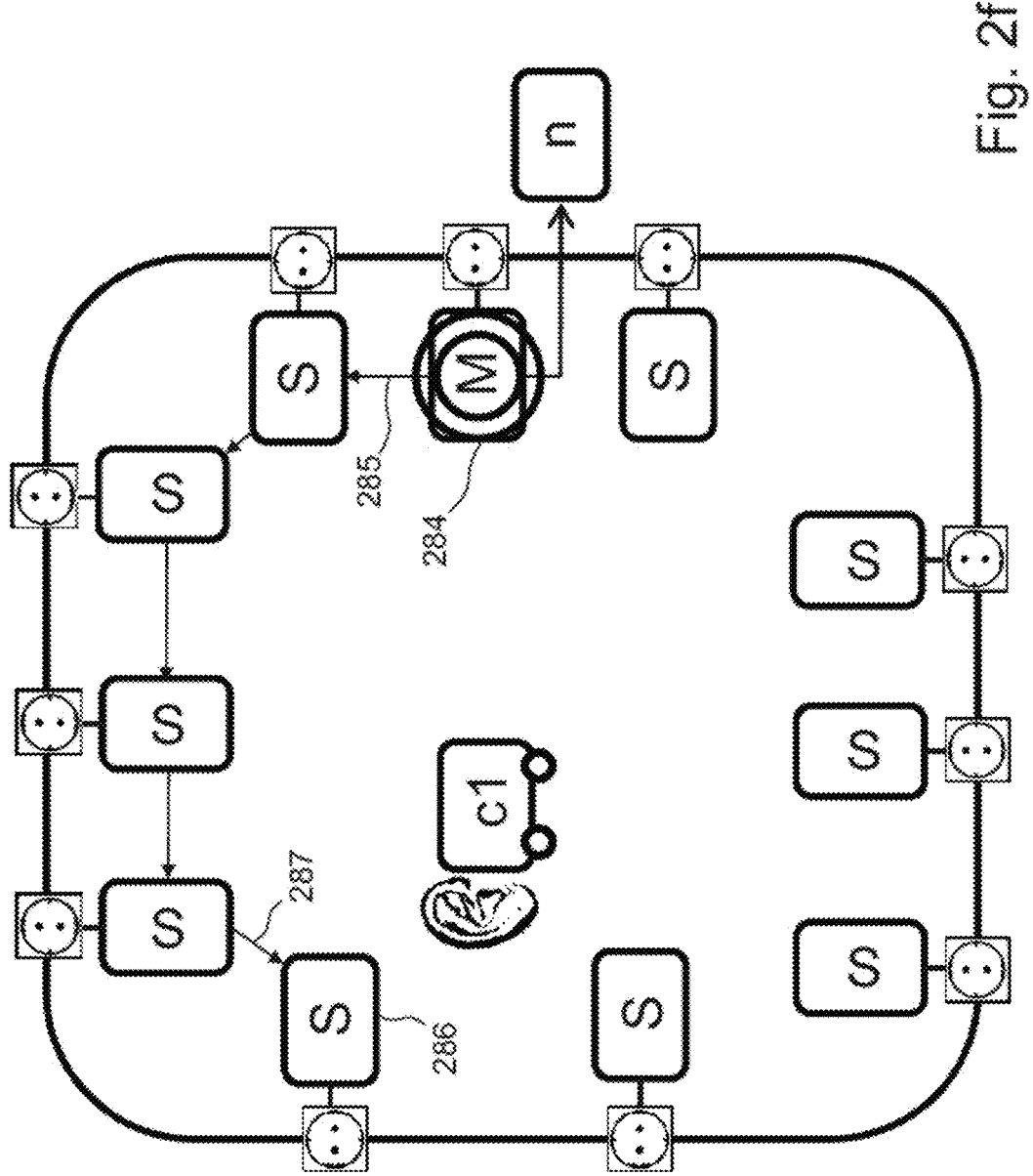
Figure 2G:
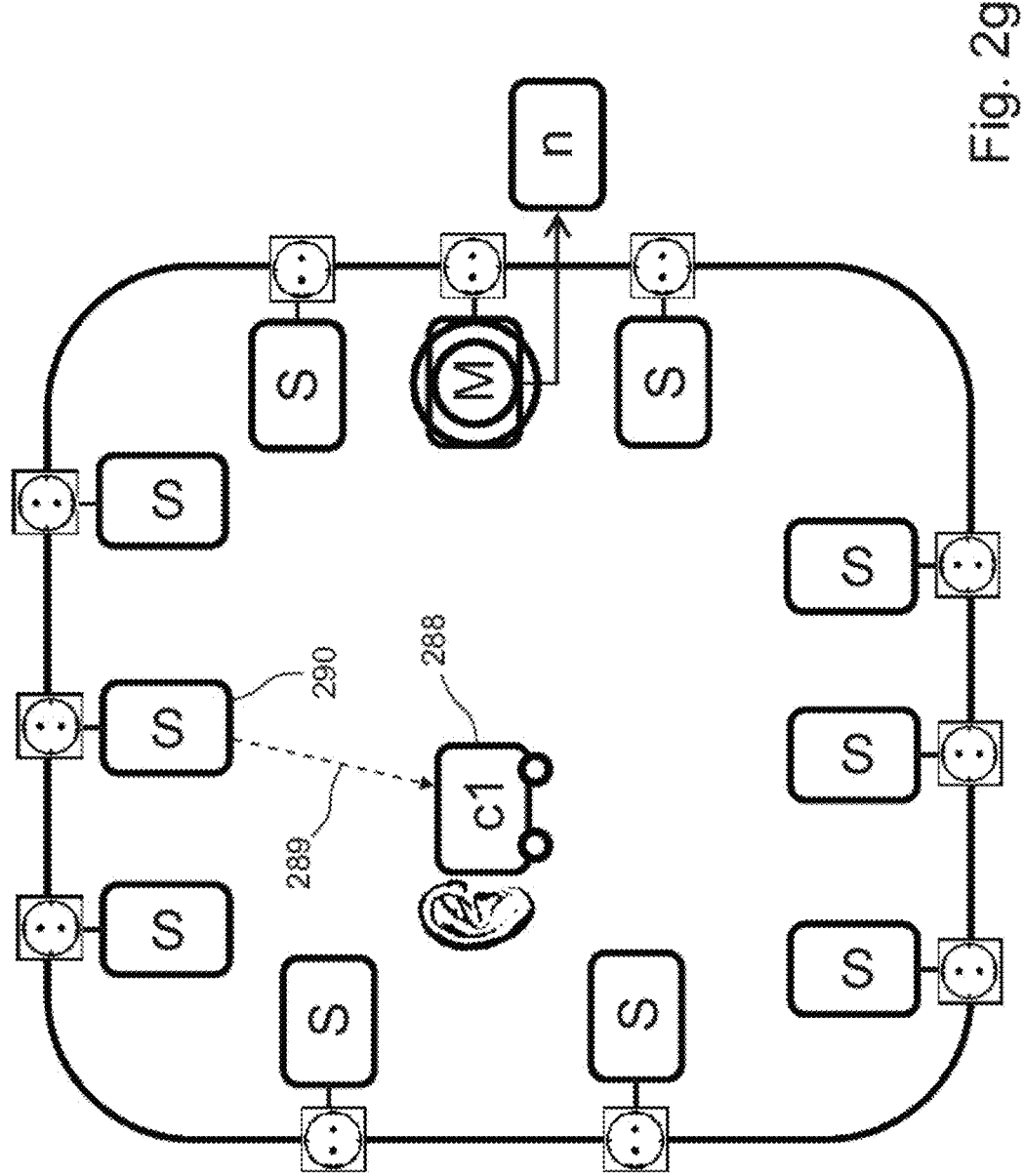

Directly after the diagnostic information has been sent, the reference nodes generate the TDMA slot map shown in FIG. 3 and wait for the start of the synchronous communication phase via the administration node. However, the same process of the above described information spreading occurs first, as is also shown in FIG. 2f for the second (upper) DC. The broadcast 284 in turn starts at the administration node and the information is then, as signified with the arrows 285 and 287, spread along the DC until the last reference node. From there, a return broadcast 286 occurs along the DC back to the administration node. In the upper DC the reference nodes also switch to synchronous communication mode, based on the TDMA slot map shown in FIG. 3.

The initializing phase of this network segment is ended with the cycle of network information described here. After the last broadcast package, which is still responding, has been received from the upper DC, the administration node also switches to synchronous communication mode and, after a short waiting period, starts the TDMA communication by spreading a broadcast, as is depicted in first slot shown in FIG. 3a. This broadcast informs all participants of the successful segment initialization. From this time onwards, the locating object 288 can register in this network segment with a random reference node via the communication 289 shown as an example in FIG. 2g.

The exemplary embodiment described above of the initialization of a localization network related here formed from at least two segments (see FIG. 1 for an individual segment) is described in the following using a flow diagram shown in FIG. 4 and is realized by the initialization of the individual network segments taking place in parallel or sequentially. Only the initialization of an individual network segment is described in the following, however this is undertaken in a uniform way for all segments of which the localization network consists. At the same time, initially only the initialization of the components belonging to the communication infrastructure i.e. in this case of the administration nodes and the reference nodes, is explicitly described. The initialization for locating objects, however, takes place in an identical manner to that of the reference nodes, unless a different mode of action is specifically referred to. Network segments can cycle through such an initialization up to any point in time. The representation in FIG. 4 and the process described in the following text when combined form the same behavior as described above based on FIGS. 2a-2g. Previously, the communication paths between the communication participants were in the middle of the description. In the following description, the sequential process will now be shown and linked with the communication flow between the communication partners by referring to the previously described Figures.

From the view of the reference nodes, as already described, the initial state or starting state is characterized in that the reference nodes are in a so-called "ALOHA" broadcast mode 400, in which provision is made for a "listen-before-talk" procedure with a stochastic telegram communication in an inherently known manner, however by switching off their own transmission function. The reference nodes only switch 405, 410, 415 between broadcast channels that are possibly available in order to detect the channels on which communication in this example is taking place via UWB radio technology. In accordance with another embodiment, the reference nodes distribute very short data packages on a selected broadcast channel in the UWB network, which announce their basic presence. This is especially of advantage as soon as they have found a communication on the selected broadcast channel 420. The dashed line 425 indicates that both steps 405, 410 and 415 and all the following steps in the area bordered by the dashed line 425 will be carried out by the reference nodes. The situation is comparable with the behavior of the participants shown in FIG. 2a.

Figure 4:
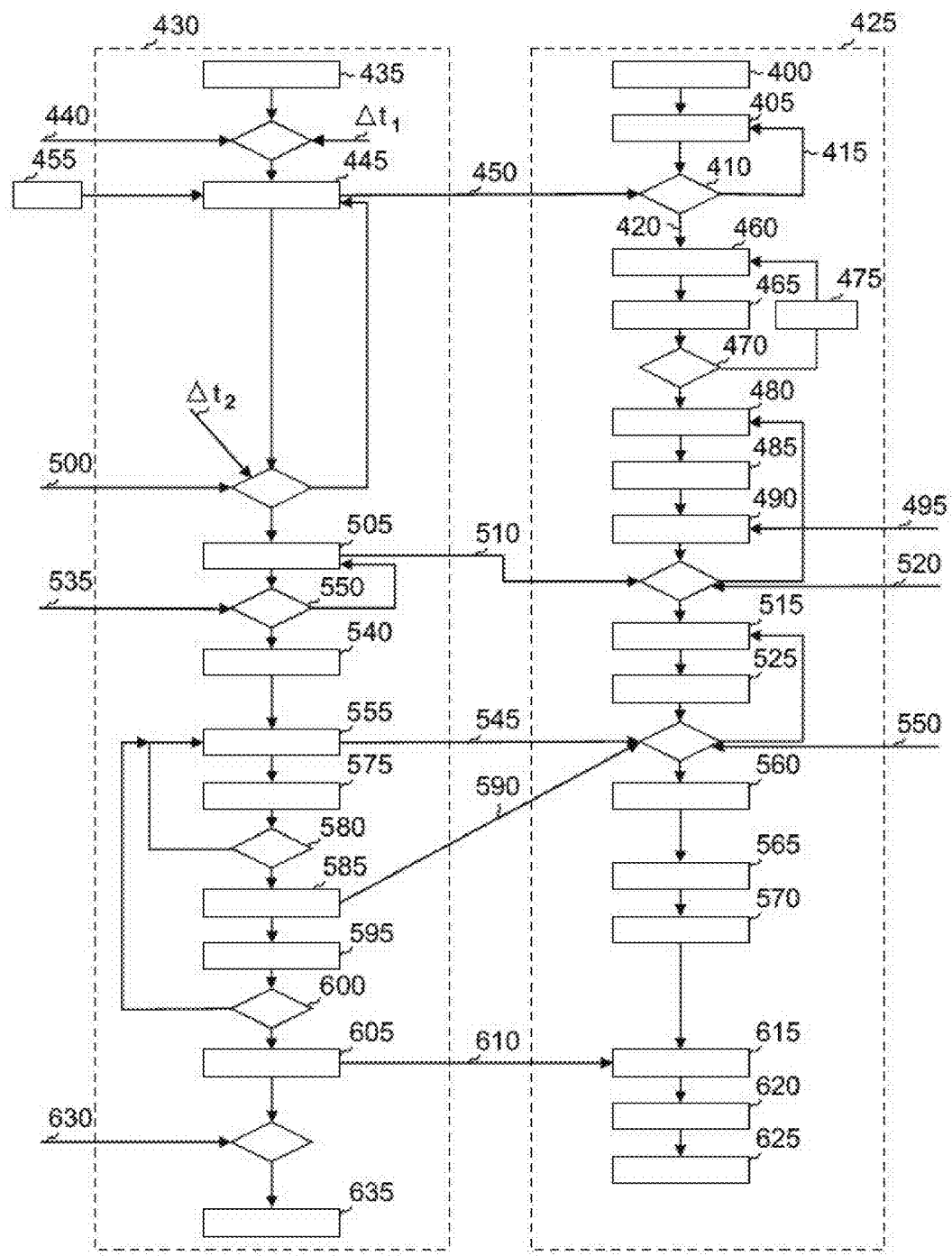
FIG. 4 shows an exemplary embodiment of the method according to the invention for network initialization based on a flow diagram.

The dashed line 430 shown in FIG. 4 shows that the steps contained within it are carried out by the administration node. The administration node is switched to an initial state 435 in the same way as the reference nodes. If the administration node, as mentioned in FIG. 1, does not have a data connection to a data processing unit or a control processor that starts the communication 440, it also starts communication in said "ALOHA" mode after a presettable waiting time $\Delta t1$, and it does this by transmitting 445 initialization data packages to the reference nodes (e.g. shown by the arrow 450). If the administration node has not yet detected a reference node in its vicinity, since these are still mute at the start of the initialization, it contacts a target address of a "virtual" reference node. If the administration node has a connection to an IT system, corresponding initialization packages can also be provided, triggered by the request 440 of the IT system.

The aforementioned initialization packages consist of a localization measurement request to a random participant (reference node), from a command that signalizes the segment initialization, and also contain further data that describe the network topology as well as the configuration status of the administration node. In a potential embodiment, this data may also include information on the firmware used, the number of available segments in the network and their SIDs, said UIDs of the reference nodes in the segment and/or in the entire localization network as well as the assignment of these reference nodes to the respective segments. The composition of this information requires that the administration node has an overview of the topology of the localization network. It can receive this overview via communication with an IT system or by means of configuration information 455 saved in its own read-only memory. A provisional specified LID can be assigned to the reference nodes which belong to an available network segment, and communicated by means of the initialization package. If necessary, all of the aforementioned information can also be split into several different data packages, wherein the data packages are made identifiable through the addition of page numbers. During this process, not all pages of the initialization packages must be sent directly to every possible participant in the segment, since it is also sufficient if the participants are able to also hear the total number of different pages as part of said broadcast from the communication with the other participants.

When sending these initialization packages via the administration node, all of the reference nodes in the network are initially occupied by switching through the available broadcast channels of the network 405, 410 and 415. As soon as they listen to the initialization package of a random administration node 450, they end 420 this channel switching process and continue working in the set broadcast channel. To secure the communication properties, the channel switching process can continue to take place at a ratio of too low signal to noise until (according to the process loop shown 405, 410, 415) the initialization package can be heard with a better signal to noise ratio. In this case, these are the initialization packages of an administration node from another network segment. If a reference node is arranged in terms of radio in a very shaded area, instead of the initialization package 450 of an administration node, the reception of the initialization packages which are, as described in the following, further spread, repeated and transmitted from another random reference node, can also result in the behavior described below.

By processing 465 the initialization packages 460 received in this way, first reference nodes receive necessary information with regard to the segmentation of the network and which reference nodes are assigned to which segment, regardless of whether they have set the broadcast channel of their target segment or not. In particular, they actually only receive the information at this point that they are reference nodes and not locating objects. Locating objects determine their classification by the fact that their UID is not contained in the information of the initialization packages on the network structure. They remain passive until the entire configuration process of the selected network segment is completed. However, they listen to every single described communication flow as passive participants and process the communicated data.

If a test step 470 additionally carried out by a reference node when listening to the initialization packages, reveals that the broadcast channel of a network segment, which the reference node is not assigned to, having been set, the reference node switches 475 into the broadcast channel of the correct target segment to which it is assigned. If the reference nodes in the correct segment have received 480 information on their preliminary LID, they exit the passive ALOHA mode using this LID. This behavior is alternatively also shown in FIG. 2b and the corresponding description text. On the one hand, the reference nodes make their presence 485 in the segment known via the broadcast channel. On the other hand, the reference nodes repeat the information about the structure of the network received to date from the administration node, in combination with a localization measurement of all other already detected reference nodes in the relevant segment or in the administration node. This secures the "avalanche effect" that now also almost all other reference nodes in the segment can contain the information of the administration node, if e.g., a radio shadow exists in environments with heavy interference. In addition to this it is ensured that reference nodes are not able to migrate into another segment.

Along with the described distance measurements and the data communication, the reference nodes collect 490 statistics about the reference node from which in its own segment a communication 495 can be heard, at which signal and fault signal levels and how often a distance measurement to a respective reference node has worked or has failed. More data can be collected for error diagnosis, including also the number and or a list of successfully received initialization package pages. This repetition continues to take place until the administration node announces the end of the initialization phase by communication or transmitting a further command via UWB.

In another embodiment of the method, the reference nodes can also be informed via an "a-priori" configuration that they represent reference nodes and/or to which network segment they are assigned. This means that a channel switch is not necessary. The initialization phase can be significantly reduced in this way, since only their provisional LID is communicated to the reference nodes, and a sufficient data base for the statistical information described above must be reached.

To reliably initialize a segment and to ensure that all reference nodes receive the necessary initialization information, the time period At2 that the administration node waits until it begins the next communication phase must be sufficiently long. The length of this time period At2 can have a fixed configuration, be controlled via a control processor or a data processing unit or the flow of this time can be communicated by an external signal or via UWB 500.

The initialization phase is ended 505 by the administration node in accordance with the conditions for the administration nodes described above, in this exemplary embodiment by the transmission of a command 510. By means of this command, it requests the reference nodes to stop spreading the initialization packages and instead to provide 515 the network with statistics about communication with other participants, wherein provision can be made for forgoing distance measurements for the benefit of pure data communication. During this process, in addition to this, the information collected from the reference nodes specified above relating to listened to participants, signal strengths etc. can in turn be packaged and transmitted 515 as data packages in the form of an XML string or in a text-based or binary exchange format. This exchange of statistics 515 takes place once the command that the administration node has sent, and that announces the end of the initialization phase, has been repeated. If a reference node cannot hear the administration node directly, at least in this way 520 it will be informed of the end of the initialization phase. The reference nodes process 525 the statistical data listened to via the broadcast signal regarding the neighboring situation, and thus supplement their entire database. In further communication packages, this updated and combined statistics database is then finally always made available to the entire segment. Ultimately, all reference nodes including the administration node have consistent information regarding the communication properties in the network.

After ending the statistics collection process 530, e.g. after an empirically predetermined waiting period which is initiated by an external data processing system via UWB or another signal 535, or if the statistics database has not changed any further over a long period of time, the administration node 540 or an IT system connected to it forms a stable segment structure in the form of functioning daisy chains. This behavior is also shown in FIG. 2c and the corresponding description. Preferably during this process two chains are formed from reference nodes which guarantee as reliable a data exchange as possible. Both chains are preferably of the same length. Alternatively, the chains can also be formed by a ring structure, a star structure or a branched structure of another kind, provided that a linear connection between two reference points is formed at least locally.

The reference nodes can also automatically end their spreading optionally after a period of time in which they no longer detect a change to the statistics database. The radio communication between the reference nodes can, however, also be ended by spreading the information to the daisy chain via the administration node 545 or the other reference nodes 550, in accordance with the model described below.

After the daisy chain has been generated, the administration node shares 555 this link with the first chain, along with a command prescribing the construction of the first daisy chain. The behavior of the network is in turn shown in FIG. 2c. This first chain is described in the following as C1. Among other things, the message used contains the length of the chain C1, a counter and the UIDs and final LIDs of the reference nodes in the sequential order in which they are in the chain C1. The message is sent 545 by the administration node firstly to the first reference node of the chain C1, or addressed to it. The first reference node switches to the LID 560 provided for it, increments the counter in the data package and confirms the receipt of the package to the transmitter. Afterwards, it sends the received data package with the incremented counter to the next following participant in the daisy chain. It must be noted that the described acknowledgement process and the forwarding of a piece of daisy chain information can also take place in one step. If the transmitter does not receive a confirmation of receipt of the chain information, it resends the package.

If the last reference node in the C1 chain has finally received the information about the chain and taken on the correct LID, it starts to send a response data package that confirms the acceptance and correct formation of the daisy chain. The confirmation is transmitted along the daisy chain backwards 570 to the administration node 575. Along with the acceptance confirmation, the data package contains the entire chain of LIDs of the participants via which the data package is further spread. Sender and addressee are also clearly marked in this response package.

If, for some reason, the daisy chain is interrupted, the reference node, which has lastly successfully received its daisy chain information along the daisy chain but has not received a confirmation from the forwarding process, alternatively starts to send the response acceptance package. The administration node can then decide 580 whether a chain has been formed "sufficiently" correctly, whether another chain configuration must potentially be chosen, or whether the localization segment is in an error state. If it was possible to correctly form the chain, or if the administration node decides to continue the segment configuration process despite erroneous chain formation, it continues 585 to apply 590 the same method that was used to form the chain C1 to the second chain, chain C2. This is also shown in FIG. 2d. The administration node also again receives a response 595 regarding the acceptance of the daisy chain from the formation of this chain. On the basis of this response, the administration node must, in turn, also decide 600 whether, overall, a stable communication structure was able to arise or be formed in the network segment.

It should be noted that if a ring-shaped chain exists (ring-shaped daisy chain), said response data package can be dispensed with, if the chain formation is successful, since the administration node, in turn, forms the end of the "chain". Nevertheless, a response package which expresses the success of the process, can be advantageous for the error tolerance in a chain like this. In further structures of the chain, a similar initialization can be achieved via the chained formation of the neighboring structure. The data packages then become more extensive, and also the generation of the acceptance information.

It should be further noted that the calculation of the daisy chains can also take place in parallel on all reference nodes. By using clear hierarchization and prioritization rules and by ensuring the existence of an identical neighboring and statistics database in all reference nodes of the segment, a similar daisy chain structure in the case of a parallel, isolated calculation can be achieved.

After the daisy chain has been configured, the administration node 605 starts to communicate or distribute 610 further information that it has about the topology of the entire network firstly along the chain C1. This information consists of information on the transformation of the selected coordinates system into other coordinates systems, an almanac list (called "almanac"), as well as further information that relates to the location in the localization network or a network diagnosis. A specified almanac list includes the existing reference nodes in the entire network and their respective position in the space. In addition to this, the list includes information about each participant which is a unique identifier ("UID") of the participant in the network unrelated to the respective position in the network, e.g. an inherently known "MAC-ID". This information can in turn be spread on several pages of a set length. The administration node transmits the information to the first reference node of the chain C1, it receives a confirmation for every transmitted data page. If the process of sending all of the pages has finished, the addressed node 615 in turn sends the same information in the same process to the next node of the chain, and so on. This communication process is repeated until the last reference node in the chain C1 has received the full network information. From here, the receipt of the network information is once again separately acknowledged returning 620 along C1, in a similar way to the process during the formation of C1. The corresponding steps 605, 610, 615 and 620 are then repeated for C2. This process is shown in FIG. 2*f*. Similar types of broadcast strategies arise for other daisy chain topologies.

After the receipt and forwarding of the confirmation package by the respective reference node, it 625 generates a TDMA slot map, shown in a table in FIG. 3 as an example, for a localization segment, initially without active participants. The reference node switches to the TDMA mode during this process. After receiving the configuration confirmation from C2 in accordance with the previous paragraph, the administration node waits for a determined amount of time before it announces the successful communication and complete initialization to the network or segment by a separate command. The length of this period of time can be pre-configured, predetermined via a control processor or a data processing unit, or the flow of the time period can be communicated 630 by an external signal or via UWB. It then generates a TMDA slot map itself, which is identical with the respective TDMA slot map of the reference node 635. The network is now completely ready for activity. From this point, the correct flow of this TDMA slot map and the normal measuring process start, in which the administration node announces the successful segment configuration in the first broadcast slot of the TDMA slot map.

The TDMA slot map shown in FIG. 3*a* schematically shows three columns and a first column 300 indicating the respective slot (time slot), a second column 305 that indicates the respective addressed communication partner according to the specification in FIG. 1 and a third column 310 indicating the resulting action in the respective slot. The TDMA slot map in this exemplary embodiment consists of 32 slots, however, larger and smaller lengths of the TDMA slot map are also conceivable. In the case of smaller lengths, the number of participating reference nodes and therefore the size of the localization segment or the topology of the DC must be correspondingly adapted. As can be seen in FIG. 3, the administration node, in its first regular forward broadcast package in the first slot of the TDMA slot map, communicates the successful segment configuration to the localization segment. This message is propagated along the daisy chain. It receives the confirmation of this from the daisy chains of the segment via a return broadcast package. The broadcast package that communicates the successful segment configuration is repeated by the administration node with each first slot of the TDMA slot map until a confirmation has been received by all reference nodes. Normally, this is the case after the first cycle of the TDMA slot map. The network segment has then reached its configuration status and is ready for the localization of participants. The slot map used here thus only represents one possible variation and other implementations are conceivable.

As described above, locating objects behave in a passive way during the entire segment or network initialization process. If this process is complete, they begin to integrate themselves into the localization segment. It should be pointed out at this point that, if the locating object has also listened to the entire initialization communication of a network segment, the registration process drastically shortens, since all current information about the status of a network is already available, and is communicated and processed simultaneously with the transfer of the localization segment in the measurement process. The log-on process then takes place almost immediately and only while communicating a minimum amount of data.

In order to prevent crosstalk of (UWB) communication channels between different segments of the localization network, it would be advantageous to generate a total of 256 channel bundles or, correspondingly, 1792 channels. Since such a number of orthogonal, i.e. non-cross talking, channels cannot be chosen at random, an approach which can be implemented with significantly less effort is shown in FIG. 3*b*. The channel bundle that is used in a single segment of the localization network is specified as a whole-number rest of the division of the SID by means of a random, a-priori configurable number of channel bundles, wherein it is of course advantageous, as shown in the example in FIG. 3, to use a square number of a whole number of SIDs, which specifies the length of the edges of the tiles specified in the Figures (in the examples 9 or 25). The selected allocated sequence of SIDS in the examples shown is selected in a regular pattern which represents a suitable implementation in an isotropic space. Depending on the real implementation scenario, a random pattern adapted to the respective usage scenario can be selected to allocate the SID in order to further improve protection from cross-talking. The implementation shown therefore only constitutes one possible embodiment of the method described.

Although only a few embodiments of the present invention have been shown and described, it is to be understood that many changes and modifications may be made thereunto without departing from the spirit and scope of the invention.

What is claimed is:

1. Method for initializing at least one network segment of a communication network for the wireless locating of moving locating physical objects arranged in a limited space by using pulsed radio signals,
wherein the at least one network segment in the limited space has at least two spaced apart reference nodes which form a chain-shaped communication network and which are autarkic in terms of communication,
wherein a locating physical object arranged in the limited space is located via a distance-based trilateration carried out by the at least three reference nodes,
wherein general information is communicated via broadcast channels for transmitting messages to the reference nodes and/or moving locating physical objects,
wherein the reference nodes listen to the broadcast channels in a listen-before-transmit standby position until initial information about their active participation in which network segment of the communication network is received, and,
wherein information about adjacent reference nodes in the underlying network segment is generated.

2. Method according to claim 1, wherein the reference nodes generate a neighbor database via communication with all other reachable reference nodes via the broadcast channels.

3. Method according to claim 2, wherein the reference nodes communicate the neighbor database to other reference nodes during the initialization.

4. Method according to claim 2, wherein the neighbor database contains information about received signal amplitudes and/or background noises, and this information is communicated to other reference nodes during the initialization.

5. Method according to claim 4, wherein the administration node forms a network segment structure from reference nodes, based on the statistical information about the frequency of occurrence of the distance measurements to neighboring reference nodes, in the shape of at least one chain.

6. Method according to claim 5, wherein at least two, substantially equally long chains are formed from reference nodes.

7. Method according to claim 2, wherein the neighbor database contains information on the distance to neighboring reference nodes, and this information is communicated to other reference nodes during the initialization.

8. Method according to claim 2, wherein the neighbor database contains statistical information on the frequency of the occurrence of distance measurements to other reference nodes, and that this information is communicated to other reference nodes during the initialization.

9. Method according to claim 1, wherein at least one administration node communicates set-up information to the reference nodes, which is successively further communicated in a chain to other reference nodes.

10. Method according to claim 9, wherein the at least one administration node is implemented in at least one reference node.

11. Method according to claim 9, wherein the set-up information comprises the chain length as well as corresponding UIDs and LIDs for the reference nodes participating on the chain.

12. Method according to claim 9, wherein, at the end of the initialization, the administration node communicates further information to the reference nodes regarding the properties of the communication network and about desired locating methods, and it does this in the form of an almanac and/or in the form of logical spaces and/or in the form of transformation information for a global coordinate system.

13. Method according to claim 1, wherein a propagating confirmation response starting from a last reference node in a chain takes place to the other reference nodes of the chain and the administration node successively via the reference nodes of the chain.

14. Method according to claim 13, wherein the information propagated in the confirmation response comprises the feedback of a respective LID.

15. Method according to claim 1, wherein an administration node transmits initialization packages to reference nodes which contain at least one localization measurement request.

16. Method according to claim 15, wherein the initialization packages include a command which signalizes the segment initialization and further information that describes the network topology and/or the configuration status of the administration node.

17. A non-transitory machine-readable data storage medium on which a computer program configured to carry out each step of the method according to claim 1 is saved.

* * * * *